July 11, 1950     C. F. ERIKSON     2,514,570
LIQUID LEVEL GAUGE
Filed Dec. 31, 1949     2 Sheets-Sheet 1
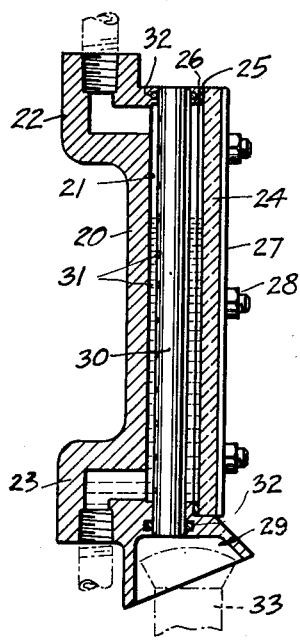
Fig. 1
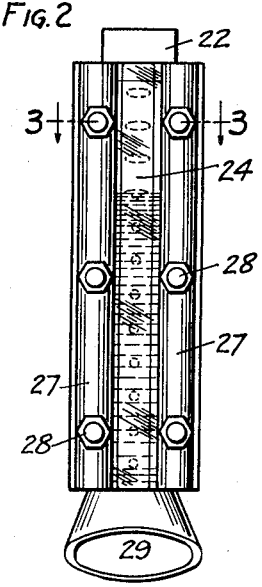
Fig. 2
Fig. 3
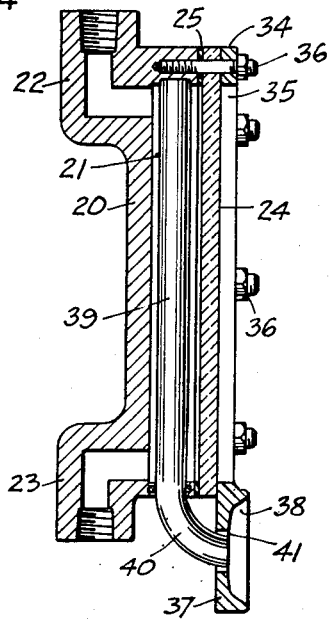
Fig. 4
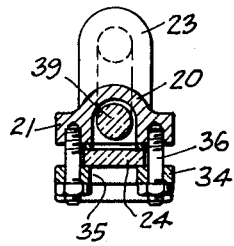
Fig. 6
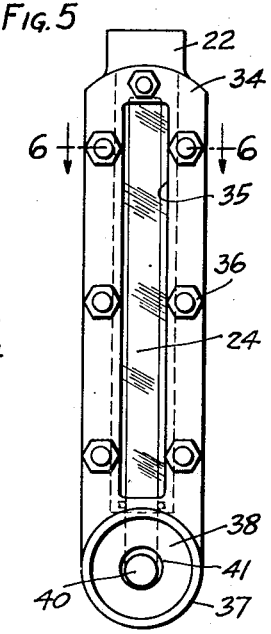
Fig. 5
INVENTOR.
CARL F. ERIKSON
BY *Walter E. Wallheim*
ATTORNEY July 11, 1950
C. F. ERIKSON
2,514,570
LIQUID LEVEL GAUGE
Filed Dec. 31, 1949
2 Sheets-Sheet 2
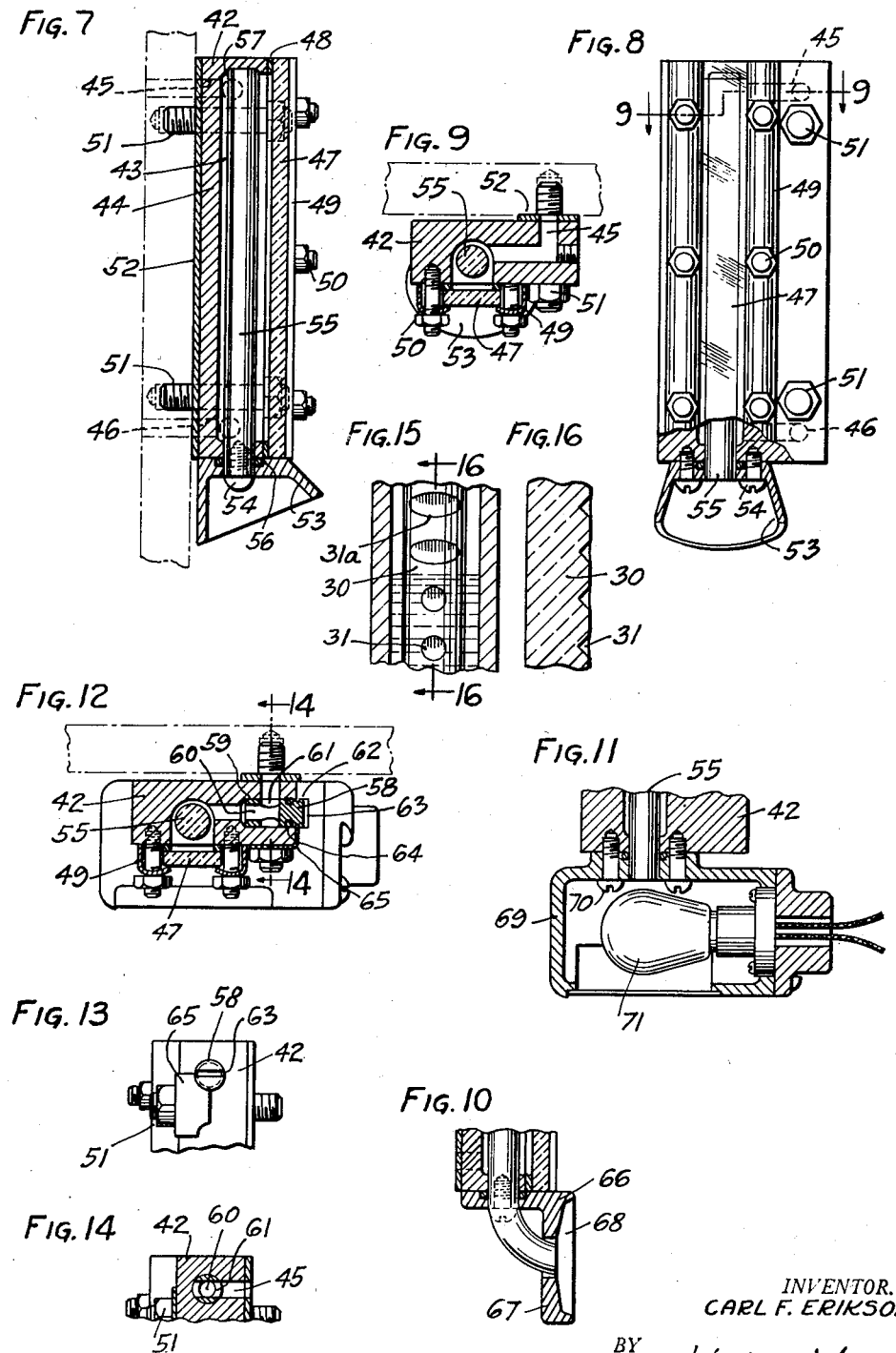
INVENTOR.
CARL F. ERIKSON
BY Walter E. Wollheim
ATTORNEY Patented July 11, 1950

2,514,570

UNITED STATES PATENT OFFICE 2,514,570

LIQUID LEVEL GAUGE

Carl F. Erikson, White Plains, N. Y., assignor to Nathan Manufacturing Company, New York, N. Y., a corporation of New York Application December 31, 1949, Serial No. 136,225

7 Claims. (Cl. 73—293)

This invention relates generally to liquid level gauges and more particularly to those wherein the level of the liquid within a vessel may be observed in an associated sight glass. While the invention is adapted for employment in determining the level of liquids generally, it is especially useful in conjunction with the reading of levels of liquid in tanks in relatively dark locations where illumination is necessary at certain times to make the desired observations.

In the usual form of liquid level gauge in dark locations, or at night, the level of the liquid can be observed by lamps which are placed either in front or in back of the gauge, or even at the top or the bottom, to illuminate the liquid for better observation of its meniscus. The liquid is generally within a glass tube or a chamber with a transparent front, the tube or chamber being connected to the tank the contents of which are to be noted. The illuminating agents, so far as known, are externally of the liquid and their rays are directed from without the gauge chamber to within it and against the liquid, respectively, its meniscus. In many cases, observations of the liquid level with these devices were difficult, owing to undesirable reflections from the illuminating member against the glass of the gauge chamber or the glass tube; further, existing sources of light were not strong enough to effectively light up the gauge. It was also found that such gauges were of more or less cumbersome construction taking considerable space and could not be applied to locations where space was at a premium, as for instance, to fuel tanks of Diesel locomotives where a gauge must be attached close to the tank and where extreme projections from the gauge must be avoided.

It is the principal object of the invention to overcome the before recited shortcomings of present gauges, by providing in a gauge attached to a tank, a light transmitting medium disposed within the chamber connected with the tank and wherein the level of the liquid in the tank can be observed through a transparent plate or the like and in which the light transmitting medium is, preferably, surrounded by the liquid in the chamber the level of which corresponds to that of the liquid in the tank.

Another object is to illuminate the light transmitting medium by simple means which may be removable or attached to the gauge structure, so that the gauges may be used, if so desired, without the illuminating means.

A further object is to provide the aforesaid medium with marks which indicate clearly on the light transmitting medium the level of the liquid for the reason that the marks appear differently when within the liquid than when above it.

Still another object is to provide in gauges of various types the principal objects of the invention, namely, a light transmitting medium in direct contact with the liquid to be observed, and simple and efficient means to illuminate the medium effectively, when desired.

Still further objects will become apparent in the following specification and the accompanying drawings in which preferred embodiments of the invention are shown.

In the drawings,

Fig. 1 is a vertical sectional view of a gauge embodying the principles of the invention, with the illuminating means separate from the gauge, but with its light receiver in line with the light transmitting medium;

Fig. 2 is a front elevational view of the same;

Fig. 3 is an horizontal sectional view along the plane of line 3—3 in Fig. 2;

Fig. 4 is a sectional view, similar to Fig. 1, but with its light receiver at right angles to the light transmitting medium;

Fig. 5 is a front elevational view of the gauge shown in Fig. 4;

Fig. 6 is an horizontal sectional view along the plane of line 6—6 in Fig. 5;

Fig. 7 is a vertical sectional view of a gauge, suitable to be attached directly to the outer wall of a tank;

Fig. 8 is a front elevational view of the same, partly in section;

Fig. 9 is an horizontal sectional view along the plane of line 9—9 in Fig. 8;

Fig. 10 is a fragmentary vertical sectional view of a modified form of light receiver suitable for application to a gauge as shown, for instance, in Fig. 7;

Fig. 11 is a fragmentary vertical sectional view of an illuminating means suitable for direct attachment to gauges of any of the types illustrated;

Fig. 12 is a modified horizontal cross sectional view of Fig. 9 embodying shut-off valves;

Fig. 13 is a fragmentary front elevational view thereof;

Fig. 14 is a fragmentary vertical sectional view along the plane of line 14—14 in Fig. 12;

Fig. 15 is an enlarged fragmentary vertical view, partly in section, of the light transmitting medium, surrounded partly by a liquid in the gauge, with the transparent front cover removed for sake of clearness, indicating on the medium the different appearance of the marking above and below the liquid when viewed through the front cover; and Fig. 16 is an enlarged fragmentary vertical sectional view of the light transmitting medium showing the marking along the plane of line 16—16 in Fig. 15.

Like characters of reference denote similar parts throughout the several views and the following specification.

Referring more particularly now to Figs. 1, 2 and 3, 20 is a gauge body having an open chamber 21, connections 22 and 23 at the top and bottom, respectively, to be attached to pipes in communication with a tank the contents of which are to be observed in the gauge. 24 is a transparent plate and 25 a gasket at its marginal portions held fluid tightly against a face 26 surrounding the opening of the chamber 21 by means of frontal strips 27 and bolts and nuts 28. The bottom of the gauge body 20 is extended in a funnel like shape at 29 to form a light receiver.

30 is a light transmitting medium made in this embodiment of the invention of a transparent rod of, preferably, round cross section. This rod may be of "Lucite," or other suitable material. At the side of the rod facing the rear wall of the gauge, are a number of round conically shaped indentations 31. The rod is inserted lengthwisely into the gauge, its lower end being located within the light receiver 29 and its upper end in the top of the gauge body 20. Packing rings 32 at the top and bottom hold the rod fluid tightly in the gauge. 33 shows in dotted lines the upper end of a manually carried flashlight within the light receiver 29 which serves as an illuminating means.

The gauge so far described embodies the invention in a very simple form. Its use and function is as follows:

The gauge is applied to the tank by means of pipes screwed into connections 22 and 23. Pipes, of course, could be omitted, and the gauge body so arranged that its connections 22 and 23, instead of being right-angled, are fastened directly to the tank in any convenient manner as explained more in detail later on. The length of the gauge may be either equal to the length of the tank, or of a length which makes it possible to observe the critical level of the liquid within the tank.

Under daylight conditions, the level of the fluid will be observed through the transparent plate 24. The indentation 31 in the rod 30 appear perfectly round below the level of the liquid, while above it they are of an elongated shape as indicated by 31a in Figures 2 and 15 and made to appear so by that part of the round rod above the liquid the curved surface of which serves as a lens. By this difference, the level of the liquid can easily be noted. This difference is still further accentuated by painting the back of the gauge chamber 21 which faces the marking 31 on the rod 30 a dark color or any shade contrasting to the liquid to be observed.

In dark locations, or at night, holding a flashlight within the light receiver 29, as indicated in dotted lines in Fig. 1, will illuminate the gauge, i. e. the rod 30 will become luminous and light up the chamber 21 and the liquid therein. Projecting the rays of light upwardly through the rod 30 causes the lower halves of the indentions 31 to be brightly illuminated providing secondary light sources within the chamber 21. This is shown in Fig. 15. The difference between the shape of the marks above and below the liquid level is now clearly noticeable and the level of the liquid in the chamber more readily observable. It is to be noted that the rod is the only light source and is disposed within the chamber of the gauge whereby undesirable reflections on the plate 24 from outside the gauge are entirely avoided.

While the marks on the back of rod 30 are shown in the shape of conical indentations 31, it is obvious that any other shape or manner of marking may be used instead. The curved surface of the rod 30 serves as a lens above the liquid and thus makes the marks appear differently above and below the liquid.

It is also possible, of course, to omit the marks altogether and depend for illuminating the gauge upon the rod 30 only receiving light from the light receiver 29. This is particularly advantageous with dark colored liquids in the gauge and tank. The dark colored liquid permits only very little light from the rod 30 to pass through it giving it an opaque appearance, while the rod above the liquid in the gauge is brightly illuminated, thus indicating clearly the level of the liquid by this contrast of light. The term "rod" is to be interpreted broadly as a longitudinal member of any suitable cross section.

In Figs. 4, 5 and 6, a slightly modified form of gauge is shown. Gauge body 20, chamber 21, connections 22 and 23, transparent plate 24, gasket 25 are substantially similar to the gauge shown in Figs. 1, 2 and 3 and the same reference numerals are used. A front plate 34 having an elongated aperture 35 is held against the transparent plate 24, by suitable bolts and nuts 36. The bottom of plate 34 is extended at 37 and shaped to form a light receiver 38. A light transmitting rod 39, similar to rod 30 of the gauge shown in Fig. 1, has its lower part outside of the gauge body bent at a suitable angle at 40, so that its end terminates within a central opening 41 of the light receiver 38.

In these figures, the marks on the rod 39 have been omitted for sake of clearness and because their use is optional, as explained before. The liquid of the level can be observed in this gauge the same as in the gauge shown in Figs. 1, 2 and 3. The flashlights, however, can be applied to the light receiver at right angles to the previously shown application which may make this gauge better adapted to locations where space below the gauge is limited. The side of the bent part 40 of the rod, projecting exteriorly of the gauge body is, preferably, painted a dark color or otherwise treated to prevent loss of light therethrough.

In Figs. 7, 8 and 9, a gauge is shown which can be applied flatly against the side of a tank. In this gauge, a body 42 has a flat back 43 and an open chamber 44. The top and bottom of the chamber 44 is connected to the tank by, respectively, right angled channels 45 and 46. 47 is a transparent plate covering the open face of chamber 44 and held against a gasket 48 surrounding the open face by frontal strips 49 and bolts and nuts 50. Bolts and nuts 51 secure the body 42 against the outer wall of the tank. 52 is a gasket interposed between the wall and the flat back 43 of the body 42, perforated to conform to the terminals of channels 45 and 46 to make a fluid-tight joint between tank and gauge.

At the bottom of the gauge body 42 is a funnel shaped light receiver 53 fastened to the gauge body by means of screws 54. 55 is a light transmitting rod having its lower end terminate within the receiver 53 and held fluid tightly within the receiver by a packing ring 56. The rod 55 extends lengthwisely through the chamber 44 and rests with its upper end within a recess 57 at the top of the chamber.

The use and function of the gauge shown in Figs. 7, 8 and 9 is the same as those previously described. In the construction illustrated, however, the rod 55 can be assembled with the receiver 53 as a unit, if so desired, and thus inserted into the gauge.

In Figs. 12, 13 and 14, a slight modification of the body of the gauge shown in Figs. 7, 8 and 9 is disclosed. In these figures parts which are the same carry the same reference numerals. At the bend of each of the channels 45 and 46 is inserted a valve plug 58 which is adapted to be rotated within an enlarged portion 59 of each of the channels, the upper channel 45 being shown in these figures. Plug 58 is bored out interiorly at 60 and has a transverse bore 61 so as to afford communication between the chamber 44 and the tank by way of channel 45. An exteriorly projecting portion 62 of the plug is slotted at 63 in a direction parallel to that of bore 61. 64 is a packing ring around the plug 58 to prevent leaks from the gauge chamber. 65 is a spring washer bent so as to be held with one part against the gauge body 42 by one of the bolts and nuts 51 and with another part to engage a recess on the plug to prevent the plug becoming disengaged from the gauge body.

In actual use, the slot 63 of the plug 58 conforms to the position of the bore 61 with respect to the channel 45. If in a horizontal position, as shown, it is indicative of communication between the gauge and the tank; if turned at right angles, it indicates that the channel is closed and that repairs to the gauge can be made without the liquid in the tank running through the gauge. In all other respects the function of the gauge is identical with those previously described.

In Fig. 10 a modification of the light receiver 53 of the gauge shown in Fig. 7 is disclosed. The receiver in Fig. 10 consists of a plate 66 held to the bottom of the gauge by screws. The plate has a depending right-angled portion 67 in front of the gauge body, cupped out to form a light receiver 68. The light transmitting rod is bent at right angles at its bottom to terminate within a central aperture of the light receiver similar to the gauge shown in Fig. 4. With this arrangement the light receiver complete with the rod can also be assembled as a unit and so inserted into the gauge.

In Fig. 11, instead of a light receiver as previously described, a lamp housing 69 is attached to the bottom of the gauge by screws 70. An electric bulb 71 is suitably socketed within the housing. The light transmitting rod terminates in the top of the housing. The functioning of this gauge is the same as those previously described. The light, however, is permanently attached and can be switched on or off, as desired. With this arrangement, too, the lamp housing complete with rod and bulb can be inserted into the gauge assembled as a unit.

While I have shown in the drawings several different types of gauges all embodying the principles of the invention, it is obvious that many other modifications may be made. So, for instance, instead of providing for the light source at the bottom of the gauge, it may be provided for at the top, or at any other convenient point. In those gauges where a straight light transmitting rod is used arrangements for the light source, that is the light receiver or the lamp housing, may be placed at both ends of the gauge whereby a symmetrical and advantageous structure is achieved. In place of a solid rod, a hollow rod or tube may be used. The cross section need not be round, but could be of any suitable shape by means of which the lens effect, described herein, can be achieved where markings are used; and could be of any cross section adapted for the purpose where no markings are used and no particular lens effect is needed. The term "rod" therefore is to be interpreted broadly, as stated before.

It is also conceivable that a fluorescent or similar lamp of elongated cylindrical form may be used instead of the light transmitting rod illustrated. In such an application, if markings are desired, they must be placed on that side of the lamp nearest the transparent viewing plate but, because there is no lens effect as with the light transmitting rod, the markings will not appear differently above or below the level of the liquid. However, where a dark colored liquid is to be observed, the light from the lamp would penetrate the liquid only faintly, so that the part of the lamp above the liquid would be very bright by contrast when switched on, facilitating observations without the use of markings. A convenient switch for the lamp can be placed immediately below the gauge body.

It is apparent that I have provided a simple gauge suitable for attachment to a tank for the observation of the level of the liquid therein which is extremely compact, occupies very little space, can be easily illuminated when desired, and is equipped with means which make possible an easy reading of the liquid level during daylight as well as when dark.

Many changes in the form, proportion, combination of parts, and minor details of construction may be resorted to without departing from the principles or sacrificing any of the advantages of the invention as defined in the appended claims.

What I claim as new, is:

1. In a liquid level gauge having a chamber connected to a tank containing a liquid, a transparent member in the wall of the chamber, a rod of transparent material within the chamber having light conducting qualities and extending through the liquid in the chamber, and a light source admitting light into the rod from the exterior of the chamber for observing the level of the liquid within the chamber through the transparent member.

2. In a liquid level gauge according to claim 1, the chamber having a background contrasting in color to that of the liquid in the gauge.

3. In a liquid level gauge according to claim 1, secondary light sources on the side of the rod deriving their light from the light source exterior of the chamber whereby the level of the liquid can be ascertained by the different appearance and brilliance of the secondary light sources above and below the level of the liquid when viewed through the transparent member.

4. In a liquid level gauge, a body having a chamber, connections to a tank in communication with the chamber, a transparent member in the wall of the chamber, and a light transmitting rod in the chamber, one end of the rod terminating exteriorly of the chamber, the body having a funnel-shaped extension surrounding the exteriorly terminating end of the rod for the optional reception of an illuminating means for the rod.

5. In a liquid level gauge, a body having a chamber, connections to a tank in communication with the chamber, a transparent member in the wall of the chamber, a funnel-shaped extension at one end of the body, a light transmitting rod in the chamber, one end of the rod projecting exteriorly of the chamber and being bent to terminate within the funnel-shaped extension of the body, the extension being adapted to receive an illuminating means for the rod, the sides of the exteriorly projecting end of the rod being coated impervious to light.

6. In a liquid level gauge having a chamber connected to a tank containing a liquid, a transparent member in the wall of the chamber, a light transmitting medium in the chamber, and means for illuminating the medium from the exterior of the chamber, the medium having a curved face nearest the transparent member and markings at its opposite face, whereby the medium distorts the markings above the level of the liquid by virtue of a lens effect of the curved face of the medium making the markings appear differently above and below the liquid when viewed through the transparent member.

7. In a liquid level gauge, a body having a chamber, connections to a tank in communication with the chamber, a transparent member in the wall of the chamber, a light transmitting rod in the chamber, one end of the rod terminating exteriorly of the chamber, and a funnel-shaped extension surrounding and supporting the exteriorly terminating end of the rod for the reception of an illuminating means for the rod, the extension and rod supported thereby forming a unit adapted to be fastened to the body.

CARL F. ERIKSON.

REFERENCES CITED

The following references are of record in the file of this patent:

UNITED STATES PATENTS

| Number | Name | Date |
|---|---|---|
| 545,727 | Rockstroh | Sept. 3, 1895 |
| 646,022 | Fletcher et al. | Mar. 27, 1900 |
| 754,034 | Zoanetto | Mar. 8, 1904 |
| 767,486 | Metten | Aug. 16, 1904 |
| 1,288,377 | Bryan | Dec. 17, 1918 |
| 1,926,945 | Hipp | Sept. 12, 1933 |
| 2,246,464 | Gerber | June 17, 1941 |
| 2,289,374 | Martin | July 14, 1942 |
| 2,303,154 | Armstrong | Nov. 24, 1942 |
| 2,484,329 | Angel et al. | Oct. 11, 1949 |

FOREIGN PATENTS

| Number | Country | Date |
|---|---|---|
| 197,538 | Great Britain | May 17, 1923 |